United States Patent
Lee et al.

(10) Patent No.: US 11,203,687 B2
(45) Date of Patent: Dec. 21, 2021

(54) BLOCK COPOLYMER COMPOSITION, METHOD OF PREPARING THE SAME, AND ASPHALT COMPOSITION INCLUDING THE SAME

(71) Applicant: LG Chem, Ltd., Seoul (KR)

(72) Inventors: Se Kyung Lee, Daejeon (KR); Tae Jung Kim, Daejeon (KR); Hyun Woo Kim, Daejeon (KR); Seong Du Lee, Daejeon (KR); Chun Hwa Lee, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/978,062

(22) PCT Filed: Nov. 20, 2019

(86) PCT No.: PCT/KR2019/015945
§ 371 (c)(1),
(2) Date: Sep. 3, 2020

(87) PCT Pub. No.: WO2020/111644
PCT Pub. Date: Jun. 4, 2020

(65) Prior Publication Data
US 2021/0017387 A1    Jan. 21, 2021

(30) Foreign Application Priority Data

Nov. 26, 2018 (KR) .................. 10-2018-0147745
Nov. 4, 2019 (KR) .................. 10-2019-0139439

(51) Int. Cl.
*C08L 95/00* (2006.01)
*C08L 53/02* (2006.01)

(52) U.S. Cl.
CPC .............. *C08L 95/00* (2013.01); *C08L 53/02* (2013.01); *C08L 2205/025* (2013.01); *C08L 2205/03* (2013.01)

(58) Field of Classification Search
CPC ............... C08F 297/04; C08F 297/044; C08F 297/046; C08L 53/02; C08L 53/025
See application file for complete search history.

(56) References Cited

U.S. PATENT DOCUMENTS

| | | | |
|---|---|---|---|
| 5,451,621 A | 9/1995 | Usmani et al. | |
| 5,567,815 A | 10/1996 | Hall et al. | |
| 2009/0131558 A1 | 5/2009 | Kim et al. | |
| 2012/0136128 A1* | 5/2012 | Yan .......................... | C07F 1/02 |
| | | | 526/194 |
| 2016/0326371 A1 | 11/2016 | Seo et al. | |
| 2017/0210841 A1 | 7/2017 | Moctezuma Espiricueto et al. | |

FOREIGN PATENT DOCUMENTS

| | | |
|---|---|---|
| CN | 1923870 A | 3/2007 |
| EP | 2062939 A1 | 5/2009 |
| EP | 3103820 A1 | 12/2016 |
| EP | 3351567 A1 | 7/2018 |
| JP | 200260583 A | 2/2002 |
| KR | 100711270 B1 | 4/2007 |
| KR | 20090052767 A | 5/2009 |
| KR | 20160052310 A | 5/2016 |
| KR | 20180043535 A | 4/2018 |
| KR | 20180057189 A | 5/2018 |
| KR | 20180076827 A | 7/2018 |

OTHER PUBLICATIONS

International Search Report for PCT/KR2019/015945 dated Mar. 2, 2020; 2 pages.
Extended European Search Report for Application No. 19891032.5 dated May 26, 2021, pp. 1-5.

* cited by examiner

*Primary Examiner* — Jeffrey C Mullis
(74) *Attorney, Agent, or Firm* — Lerner, David, Littenberg, Krumholz & Mentlik, LLP

(57) ABSTRACT

Provided is a block copolymer composition, and more particularly, a block copolymer composition including a diblock copolymer and a triblock copolymer. The diblock copolymer includes a first block containing a first conjugated diene-based monomer-derived repeating unit and a second block containing a first vinyl aromatic monomer-derived repeating unit, and a functional group derived from a modified initiator represented by the Chemical Formula 1 (see description of the invention) is included at one end of the diblock copolymer. A method of preparing the same, and an asphalt composition including the same, are provided.

12 Claims, No Drawings

BLOCK COPOLYMER COMPOSITION, METHOD OF PREPARING THE SAME, AND ASPHALT COMPOSITION INCLUDING THE SAME

CROSS-REFERENCE TO RELATED APPLICATIONS

The present application is a national stage entry under 35 U.S.C. § 371 of International Application No. PCT/KR2019/015945 filed on Nov. 20, 2019, which claims priority to Korean Patent Application No. 10-2018-0147745, filed on Nov. 26, 2018 and Korean Patent Application No. 10-2019-0139439, filed on Nov. 4, 2019, the entire contents of which are incorporated herein as a part of the specification.

TECHNICAL FIELD

The present invention relates to a block copolymer composition, and more particularly, to a block copolymer composition for use as an asphalt modifying agent, a method of preparing the same, and an asphalt composition including the same.

BACKGROUND ART

Asphalt which is a residue remaining after most of the volatile fraction evaporates from the components of crude oil, maintains a highly viscous liquid or semi-solid state at a high temperature, but also has a physical property of hardening at or below room temperature. In addition, since asphalt is very plastic, is highly water-proof, has high electrical insulation, adhesive properties, and the like, and has chemically stable properties, it is widely applied to building materials such as road pavement materials or water-proof materials. However, the asphalt has a problem in that when the asphalt is exposed to a high temperature for a long period during its use, plastic deformation occurs, and at a low temperature, cracks occur due to external shock.

In order to solve the problem, recently, studies to improve the physical properties of asphalt by adding various polymers have been conducted.

For example, there is a method of using a vinyl aromatic hydrocarbon-conjugated diene copolymer such as styrene-butadiene-styrene (SBS) copolymer as a modifying agent or an impact reinforcing agent for improving the physical properties of an asphalt composition.

In general, compatibility with asphalt is most basically and essentially required for using the SBS copolymer in the asphalt composition.

However, due to recent crude oil price rise and energy saving policies, oil-refining facilities are continuously advancing, and the content of asphaltene which is a by-product in the asphalt as an oil refining residue has been increased. Since the asphaltene which is an aggregate of aromatic hydrocarbons has many polar functional groups at the end, it has very low compatibility with an SBS copolymer having no polar functional group. Therefore, the processing time of an asphalt composition is greatly increased, and also the quality degradation of asphalt such as the elasticity degradation of an improved asphalt composition is caused.

In order to solve the problems as such, there have been a method of adjusting the molecular weight of an SBS copolymer, a method of changing a molecular fine structure of the SBS copolymer so that a coupling effect is added, a method of adding an additive such as an oil as a processing aid, or the like; however, since an individually prescribed method should be provided for each asphalt having various quality deviations, these methods are not ultimate solutions.

Accordingly, development of an SBS copolymer as an asphalt modifying agent having excellent compatibility with asphalt is urgent.

DISCLOSURE

Technical Problem

A technical problem to be solved in the present invention is to improve the softening point and the solubility of an asphalt composition by including an end-modified diblock copolymer in a block copolymer composition used as an asphalt modifying agent, in order to solve the problems mentioned in the Background Art.

That is, an object of the present invention is to provide a block copolymer composition which may be used as an asphalt modifying agent, and to provide an asphalt composition having improved softening point and solubility when an asphalt is modified using the block copolymer composition.

Technical Solution

In one general aspect, a block copolymer composition includes a diblock copolymer and a triblock copolymer, wherein the diblock copolymer includes a first block containing a first conjugated diene-based monomer-derived repeating unit and a second block containing a first vinyl aromatic monomer-derived repeating unit, and a functional group derived from a modified initiator represented by the following Chemical Formula 1 is included at one end of the diblock copolymer:

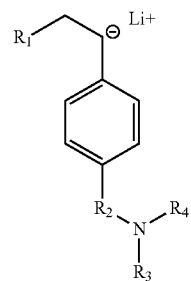

[Chemical Formula 1]

wherein $R_1$ is a hydrocarbyl group having 1 to 20 carbon atoms; $R_2$ is an alkylene group having 1 to 30 carbon atoms; and $R_3$ and $R_4$ are independently of each other hydrogen or an alkyl group having 1 to 30 carbon atoms.

In another general aspect, a method of preparing a block copolymer composition includes: preparing a first block containing a first conjugated diene-based monomer-derived repeating unit in the presence of a modified initiator represented by the following Chemical Formula 1; polymerizing a second block containing a first vinyl aromatic monomer-derived repeating unit in the presence of the first block prepared in the previous step, to prepare a diblock copolymer; preparing a triblock copolymer; and mixing the diblock copolymer and the triblock copolymer.

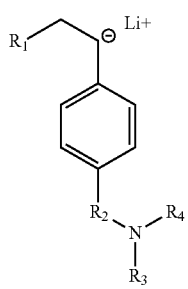

[Chemical Formula 1]

wherein $R_1$ is a hydrocarbyl group having 1 to 20 carbon atoms; $R_2$ is an alkylene group having 1 to 30 carbon atoms; and $R_3$ and $R_4$ are independently of each other hydrogen or an alkyl group having 1 to 30 carbon atoms.

In still another general aspect, an asphalt composition includes the block copolymer composition and asphalt.

Advantageous Effects

When the block copolymer composition according to the present invention is used as an asphalt modifying agent, both the softening point and the solubility of an asphalt composition are improved to excellent levels.

BEST MODE

The terms and words used in the description and claims of the present invention are not to be construed limitedly as having general or dictionary meanings but are to be construed as having meanings and concepts meeting the technical ideas of the present invention, based on a principle that the inventors are able to appropriately define the concepts of terms in order to describe their own inventions in the best mode.

In the present invention, the terms, "-derived repeating unit", "-derived functional group", and "-derived linking group" may represent a component or a structure resulted from a material, or the material itself. As a specific example, "-derived repeating unit" may refer to a repeating unit formed in a polymer by monomers introduced participating in a polymerization reaction during polymerization, "-derived functional group" may refer to a functional group linked to one end of the repeating unit formed in a polymer by an initiator introduced participating in the polymerization reaction during polymerization, and "-derived linking group" may refer to a linking group linking each polymer in polymers coupled by the coupling agent introduced participating in a coupling reaction during a coupling reaction between the polymers.

In the present invention, the term, "block" may refer to a repeating unit group composed of only an identical monomer-derived repeating unit, formed by only identical monomers participating in a polymerization reaction in a copolymer; and as a specific example, a block containing a vinyl aromatic monomer-derived repeating unit may refer to a block formed by only repeating units derived from vinyl aromatic monomers, and a block containing a conjugated diene-based monomer-derived repeating unit may refer to a block formed by only repeating units derived from conjugated diene-based monomers.

In the present invention, the terms, "diblock copolymer" and "triblock copolymer" may refer to copolymers containing two or more kinds of blocks derived from different monomers.

In the present invention, the term, "active polymer" may refer to a polymer which is formed by an anionic polymerization reaction, in which one end of the polymer maintains in an anionic state to allow additional polymerization or reaction, and as a specific example, may refer to a living anionic polymer.

In the present invention, the term, "solution" may mean that a polymer, a diblock copolymer, and a block copolymer produced by a polymerization or coupling reaction in each step of a method of preparing a block copolymer composition are included in a hydrocarbon-based solvent in a dispersed or dissolved form therein.

<Block Copolymer Composition>

The block copolymer composition according to the present invention may include a diblock copolymer and a triblock copolymer.

In general, in a vinyl aromatic-conjugated diene block copolymer which is mainly used as an asphalt modifying agent, in particular, a styrene-butadiene-styrene (SBS) triblock copolymer, the factors related to the fine structure of a molecule such as the contents of a styrene block and a butadiene block and the content of a vinyl group present in a conjugated diene block correlate with each other, and thus, when physical properties at a high temperature rises, physical properties at low temperature are lowered, and when a dissolution rate is increased, mechanical physical properties are lowered, and problems such as a gel being formed in the asphalt composition during sulfur crosslinking occur. However, the block copolymer composition according to the present invention includes a diblock copolymer including a modified initiator-derived functional group at one end, together with a triblock copolymer, whereby there is an effect of improving a softening point and solubility, without introducing an additive, adjusting the molecular weight of the triblock copolymer, or changing a molecular fine structure.

The diblock copolymer included in the block copolymer composition according to the present invention may include a first block containing a first conjugated diene-based monomer-derived repeating unit and a second block containing a first vinyl aromatic monomer-derived repeating unit, wherein a functional group derived from a modified initiator represented by the following Chemical Formula 1 may be included at one end of the diblock copolymer. Meanwhile, the one end may be one end of the first block of the diblock copolymer.

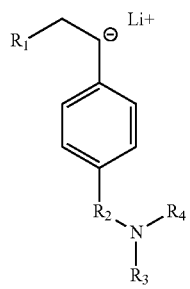

[Chemical Formula 1]

wherein $R_1$ is a hydrocarbyl group having 1 to 20 carbon atoms, 1 to 15 carbon atoms, or 2 to 8 carbon atoms; $R_2$ is an alkylene group having 1 to 30 carbon atoms, 1 to 20 carbon atoms, or 1 to 8 carbon atoms; and $R_3$ and $R_4$ are independently of each other hydrogen or an alkyl group having 1 to 30 carbon atoms, 1 to 20 carbon atoms, or 1 to 8 carbon atoms.

The first block containing the first conjugated diene-based monomer-derived repeating unit of the diblock copolymer may be a block formed by polymerization of the first conjugated diene-based monomer. The first conjugated diene-based monomer for forming the first block may be one or more selected from the group consisting of 1,3-butadiene, 2,3-dimethyl-1,3-butadiene, piperylene, 3-butyl-1,3-octadiene, isoprene, 2-phenyl-1,3-butadiene, and 2-halo-1,3-butadiene (wherein halo denotes a halogen atom). The content of the first conjugated diene-based monomer-derived repeating unit may be 60 parts by weight to 80 parts by weight, 65 parts by weight to 75 parts by weight, or 67 parts by weight to 73 parts by weight, based on total 100 parts by weight of the diblock copolymer. Within the range, when the block copolymer composition including the diblock copolymer is used as the asphalt modifying agent, there is an effect of improving a softening point and solubility of the asphalt composition.

In addition, the second block containing the first vinyl aromatic monomer-derived repeating unit of the diblock copolymer may be a block formed by polymerization of the first vinyl aromatic monomer. The first vinyl aromatic monomer for forming the second block may be one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene, and 1-vinyl-5-hexylnaphthalene. The content of the first vinyl aromatic monomer-derived repeating unit may be 20 parts by weight to 40 parts by weight, 25 parts by weight to 35 parts by weight, or 27 parts by weight to 33 parts by weight, based on total 100 parts by weight of the diblock copolymer. Within the range, when the block copolymer composition including the diblock copolymer is used as the asphalt modifying agent, there is an effect of improving a softening point and solubility of the asphalt composition.

Meanwhile, in order to further improve the softening point and the solubility of the asphalt composition including the diblock copolymer composition, the functional group derived from the modified initiator represented by the following Chemical Formula 1 may be included at one end of the diblock copolymer, as a specific example, at one end of the first block:

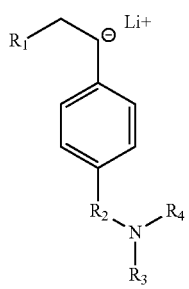

[Chemical Formula 1]

wherein $R_1$ is a hydrocarbyl group having 1 to 20 carbon atoms, 1 to 15 carbon atoms, or 2 to 8 carbon atoms; $R_2$ is an alkylene group having 1 to 30 carbon atoms, 1 to 20 carbon atoms, or 1 to 8 carbon atoms; and $R_3$ and $R_4$ are independently of each other hydrogen or an alkyl group having 1 to 30 carbon atoms, 1 to 20 carbon atoms, or 1 to 8 carbon atoms.

As a specific example, the modified initiator represented by Chemical Formula 1 may be represented by the following Chemical formulae 2 and 3:

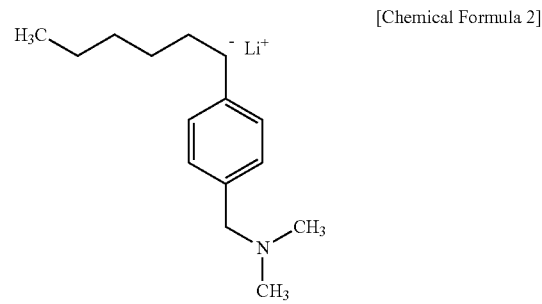

[Chemical Formula 2]

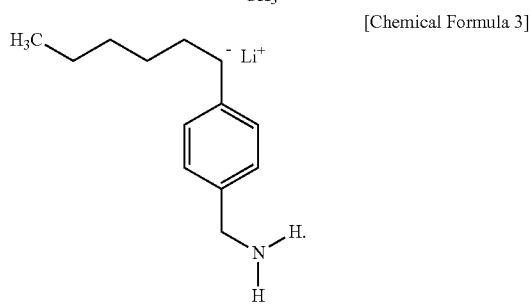

[Chemical Formula 3]

The modified initiator of the modified initiator-derived functional group may be a modified initiator prepared by modification into a benzyl amine-based compound for improving the softening point and the solubility of the asphalt composition. When the functional group derived from the benzyl amine-based compound is positioned at one end of the diblock copolymer, there is an effect of increasing an affinity between a polar group present in asphalt and the modified initiator-derived functional group to improve solubility of the diblock copolymer including the functional group in asphalt. This improvement of solubility of the diblock copolymer helps chain relaxation of the triblock copolymer included together in the block copolymer composition, whereby there is an effect of improving overall solubility of the block copolymer composition. In addition, after the diblock copolymer is dissolved in asphalt, a reaction between the functional groups derived from a benzyl amine-based compound in the diblock copolymer may occur due to a high temperature (180° C. or higher) in the asphalt, and the diblock copolymer which has undergone the reaction is modified into a triblock copolymer form or a form in which multiple diblock copolymers are bonded, thereby increasing a high molecular content and contributing physical property improvement. Therefore, when the block copolymer including the diblock copolymer containing the modified initiator-derived functional group at one end is used as an asphalt modifying agent, there is an effect of improving the softening point and the solubility of the asphalt composition.

In addition, the modified initiator may be a vinyl group-substituted one, among the benzyl amine-based compounds, and thus, the modified initiator may serve to initiate a polymerization reaction during preparation of the diblock copolymer, and also, in the final step of the reaction, serve to perform an interaction such as gelation including hydrogen bonding and covalent bonding between the modified initiator-derived functional groups.

That is, the modified initiator according to the present invention serves as an initiator, and the end of the diblock copolymer prepared using the modified initiator may be effectively modified. Therefore, since modification into a triblock copolymer form or a form in which multiple diblock copolymers are bonded by an interaction between the modified initiator-derived functional groups occurs during modified asphalt preparation without introducing a coupling agent, there is an effect of increasing a high molecular content and contributing physical property improvement. Accordingly, there is an effect of having excellent compatibility with the components included in the asphalt composition and an excellent softening point of the asphalt composition.

The content of the modified initiator-derived functional group may be 0.248 parts by weight to 0.322 parts by weight, 0.248 parts by weight to 0.32 parts by weight, or 0.25 parts by weight to 0.3 parts by weight, based on total 100 parts by weight of the diblock copolymer. Within the range, when the block copolymer composition including the diblock copolymer is used as the asphalt modifying agent, there is an effect of improving a softening point and solubility of the asphalt composition.

The triblock copolymer included in the block copolymer composition according to the present invention may include a third block containing a second vinyl aromatic monomer-derived repeating unit, a fourth block containing a second conjugated diene-based monomer-derived repeating unit, and a coupling agent-derived linking group.

The third block containing the second vinyl aromatic monomer-derived repeating unit of the triblock copolymer may be a block formed by polymerization of the second vinyl aromatic monomer. The second vinyl aromatic monomer for forming the third block may be one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene, and 1-vinyl-5-hexylnaphthalene, and may be identical to or different from the first vinyl aromatic monomer described above. The content of the second vinyl aromatic monomer-derived repeating unit may be 20 parts by weight to 40 parts by weight, 25 parts by weight to 35 parts by weight, or 27 parts by weight to 33 parts by weight, based on total 100 parts by weight of the triblock copolymer. Within the range, when the block copolymer composition including the triblock copolymer is used as the asphalt modifying agent, there is an effect of improving a softening point and solubility of the asphalt composition.

In addition, a fourth block containing the second conjugated diene-based monomer-derived repeating unit of the triblock copolymer may be a block formed by polymerization of the second conjugated diene-based monomer. The second conjugated diene-based monomer for forming the fourth block may be one or more selected from the group consisting of 1,3-butadiene, 2,3-dimethyl-1,3-butadiene, piperylene, 3-butyl-1,3-octadiene, isoprene, 2-phenyl-1,3-butadiene, and 2-halo-1,3-butadiene (wherein halo denotes a halogen atom), and may be identical to or different from the first conjugated diene-based monomer described above. The content of the second conjugated diene-based monomer-derived repeating unit may be 60 parts by weight to 80 parts by weight, 65 parts by weight to 75 parts by weight, or 67 parts by weight to 73 parts by weight, based on 100 parts by weight of the triblock copolymer. Within the range, when the block copolymer composition including the triblock copolymer is used as the asphalt modifying agent, there is an effect of improving a softening point and solubility of the asphalt composition.

The coupling agent-derived linking group may be a linking group which links blocks containing a plurality of second conjugated diene-based monomer-derived repeating units. The coupling agent for forming the coupling agent-derived linking group may be one or more selected from the group consisting of vinyl group-containing hydrocarbon-based compounds, ester-based compounds, silane-based compounds, polysiloxane-based compounds, and polyketones. As a specific example, the coupling agent is a polyfunctional coupling agent and may be one or more selected from the group consisting of vinyl group-containing hydrocarbon-based compounds such as divinylbenzene; ester-based compounds such as diethyladipate and glycidyl methacrylate; silane-based compounds such as dimethyldichlorosilane, methyldichlorosilane, methoxysilane, glycidoxy trimethoxysilane, and oxydipropyl bis(trimethoxysilane); polysiloxane-based compounds such as α,ω-bis(2-trichlorosilylethyl)polydimethylsiloxane; polyketones, and the like. The content of the coupling agent-derived linking group may be 0.278 parts by weight to 0.516 parts by weight, 0.28 parts by weight to 0.51 parts by weight, or 0.285 parts by weight to 0.45 parts by weight, based on total 100 parts by weight of the triblock copolymer. Within the range, coupling efficiency is increased, and when the block copolymer composition including the triblock copolymer is used as the asphalt modifying agent, there is an effect of improving a softening point of the asphalt composition.

Meanwhile, the content of the diblock copolymer may be 25% by weight to 42% by weight, 30% by weight to 40% by weight, or 30% by weight to 35% by weight, and the content of the triblock copolymer may be 58% by weight to 75% by weight, 60% by weight to 70% by weight, or 65% by weight to 70% by weight, based on the total content of the block copolymer composition. Within the range, when the block copolymer composition is used as the asphalt modifying agent, there is an effect of improving a softening point and solubility of the asphalt composition.

Here, the coupling efficiency of the block copolymer composition may be 62% to 79%, 62% to 73%, or 65% to 67%, and within the range, there is an effect of improving the softening point and the solubility of the asphalt composition including the block copolymer composition according to the present invention as the asphalt modifying agent.

<Method of Preparing Block Copolymer Composition>

According to the present invention, a method of preparing the block copolymer composition may be provided. The method of preparing a block copolymer composition according to the present invention may include preparing a diblock copolymer; preparing a triblock copolymer; and mixing the diblock copolymer and the triblock copolymer.

The step of preparing a diblock copolymer may include preparing a first block containing a first conjugated diene-based monomer-derived repeating unit in the presence of a modified initiator represented by the following Chemical Formula 1; and polymerizing a second block containing a first vinyl aromatic monomer-derived repeating unit in the presence of the first block prepared in the previous step, to prepare a diblock copolymer.

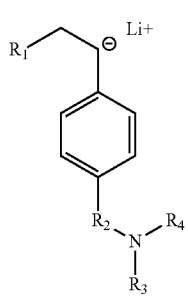

[Chemical Formula 1]

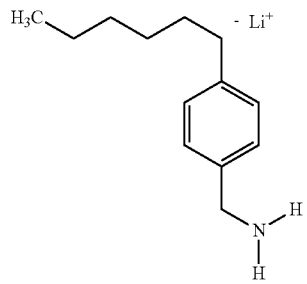

[Chemical Formula 3]

wherein $R_1$ is a hydrocarbyl group having 1 to 20 carbon atoms, 1 to 15 carbon atoms, or 2 to 8 carbon atoms; $R_2$ is an alkylene group having 1 to 30 carbon atoms, 1 to 20 carbon atoms, or 1 to 8 carbon atoms; and $R_3$ and $R_4$ are independently of each other hydrogen or an alkyl group having 1 to 30 carbon atoms, 1 to 20 carbon atoms, or 1 to 8 carbon atoms.

The modified initiator may be used by reacting a polymerization initiator and a vinyl group-substituted benzyl amine-based compound to prepare a modified initiator represented by Chemical Formula 1.

As a specific example, the modified initiator of Chemical Formula 1 wherein $R_1$ is derived from a butyl group, $R_2$ is a methylene group, and each of $R_3$ and $R_4$ is a methyl group is represented by the following Chemical Formula 2.

When N,N-dimethylvinylbenzylamine is used as a starting material, with which n-butyllithium as a polymerization initiator reacts, n-butyllithium is substituted on one end to form the benzylamine-based compound as an active polymer.

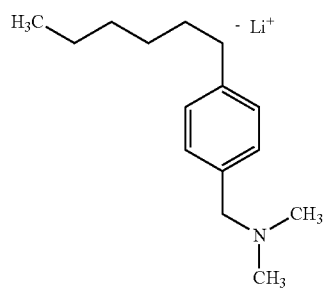

[Chemical Formula 2]

As another specific example, the modified initiator of Chemical Formula 1 wherein $R_1$ is derived from a butyl group, $R_2$ is a methylene group, and each of $R_3$ and $R_4$ is hydrogen is represented by the following Chemical Formula 3. When vinyl benzyl amine is used as a starting material, with which n-butyllithium as a polymerization initiator reacts, n-butyllithium is substituted on one end to form the benzylamine-based compound as an active polymer.

As the polymerization initiator, in addition to n-butyllithium, methyllithium, ethyllithium, propyllithium, s-butyllithium, t-butyllithium, hexyllithium, n-decyllithium, t-octyllithium, phenyllithium, 1-naphthyllithium, n-eicosyllithium, 4-butylphenyllithium, 4-tolyllithium, cyclohexyllithium, 3,5-di-n-heptylcyclohexyllithium, 4-cyclopentyllithium, naphthylsodium, naphthyl potassium, lithium alkoxide, sodium alkoxide, potassium alkoxide, lithium sulfonate, sodium sulfonate, potassium sulfonate, lithium amide, sodium amide, potassium amide, lithium isopropylamide, and the like may be used.

Preparation of the modified initiator according to the present invention may be carried out at a temperature of 50° C. to 70° C., 53° C. to 68° C., or 58° C. to 62° C. for 5 minutes to 20 minutes, 5 minutes to 15 minutes, or 7 minutes to 12 minutes. Within the range, a reaction rate of the polymerization initiator and the vinyl group-substituted benzyl amine-based compound is high, whereby there is an effect of easy preparation of the modified initiator.

A mole ratio of the starting material and the polymerization initiator during the preparation reaction of the modified initiator may be 1:0.7 to 1.1, 1:0.75 to 1.1, or 1:0.8 to 1.1. Within the range, a reaction rate of the polymerization initiator and the vinyl group-substituted benzyl amine-based compound is high, whereby there is an effect of easy preparation of the modified initiator.

The step of preparing the first block may be a step of preparing a first monoblock polymer solution containing a first conjugated diene-based monomer-derived repeating unit, by adding a first conjugated diene-based monomer in the presence of a modified initiator in a hydrocarbon-based solvent and performing polymerization. The first monoblock polymer solution prepared in the step of preparing the first block includes a polymer for forming a block containing the first conjugated diene-based monomer-derived repeating unit.

The step of polymerizing a second block to prepare a diblock copolymer may be a step of preparing a first diblock copolymer solution including the first block containing the first conjugated diene-based monomer-derived repeating unit and the second block containing the first vinyl aromatic monomer-derived repeating unit, by adding a first vinyl aromatic monomer to the first monoblock polymer solution containing the first conjugated diene-based monomer-derived repeating unit, prepared in the step of preparing the first block, and performing polymerization. Since the polymer for forming a block is a living anionic polymer in which the end of the polymer is in an anion active state by polymerization, the step of polymerizing the second block to prepare the diblock copolymer may be carried out without introducing a separate polymerization initiator. That is, the step may be a step for preparing the first diblock copolymer solution including the first diblock copolymer, in which the second block according to the first vinyl aromatic monomer which is introduced during polymerization, is formed, subsequent to the block of the first conjugated diene-based monomer-derived repeating unit, by carrying out polymerization of the first vinyl aromatic monomer which is further introduced from the living anionic polymer.

The step of preparing a triblock copolymer may include preparing a triblock copolymer including a third block containing a second vinyl aromatic monomer-derived repeating unit, a fourth block containing the second conjugated diene-based monomer-derived repeating unit, and a coupling agent-derived linking group in a hydrocarbon solvent.

The step of preparing the triblock copolymer may be carried out separately from the step of preparing a diblock copolymer, or may be carried out simultaneously with or subsequent to the preparation of the diblock copolymer.

The preparation of the triblock copolymer may be carried out by including, as a specific example, adding the second vinyl aromatic monomer in the presence of a polymerization initiator which may be commonly used in the art in a hydrocarbon-based solvent and performing polymerization, to prepare the second monoblock polymer solution including a polymer for forming the third block containing a second vinyl aromatic monomer-derived repeating unit; adding the second conjugated diene-based monomer to the polymer solution for forming the third block containing the second vinyl aromatic monomer-derived repeating unit prepared in the step of preparing the second monoblock polymer solution and performing polymerization, to prepare the second diblock copolymer solution including the second diblock copolymer including the third block containing the second vinyl aromatic monomer-derived repeating unit and the fourth block containing the second conjugated diene-based monomer-derived repeating unit; and adding a coupling agent to the second diblock copolymer solution prepared in the step of preparing the second diblock copolymer solution and performing a coupling reaction to prepare the triblock copolymer including the third block containing the second vinyl aromatic monomer-derived repeating unit, the fourth block containing the second conjugated diene-based monomer-derived repeating unit, the coupling agent-derived linking group.

The step of preparing the second monoblock polymer solution may be a step for preparing the second monoblock polymer solution including a polymer for forming the third block containing the second vinyl aromatic monomer-derived repeating unit for forming the third block containing the second vinyl aromatic monomer-derived repeating unit by initiating polymerization during polymerization of the triblock copolymer. The second monoblock polymer solution prepared in the step of preparing the second monoblock polymer solution may include a polymer for forming a block containing the second vinyl aromatic monomer-derived repeating unit.

In addition, the step of preparing the second diblock copolymer solution may be a step for preparing the second diblock copolymer solution including the second diblock copolymer including the third block containing the second vinyl aromatic monomer-derived repeating unit and the fourth block containing the second conjugated diene-based monomer-derived repeating unit, by adding the second conjugated diene-based monomer in the presence of the polymer for forming the third block containing the second vinyl aromatic monomer-derived repeating unit included in the second monoblock polymer solution prepared in the step of preparing the second monoblock polymer solution and performing polymerization. The second monoblock polymer solution prepared in the step of preparing the second monoblock polymer solution includes the polymer for forming the second vinyl aromatic monomer-derived repeating unit block, and since the polymer is a living anionic polymer in which the end of the polymer is in an anion active state by polymerization in the previous step of preparing the second monoblock polymer solution, the step of preparing the second diblock copolymer may be carried out without introducing a separate polymerization initiator. That is, the step of preparing the second diblock copolymer may be a step for preparing the second diblock copolymer, in which a block according to the second conjugated diene-based monomer introduced in the step of preparing the second diblock copolymer is formed, subsequent to the third block containing the second vinyl aromatic monomer-derived repeating unit, by carrying out a polymerization reaction of the second conjugated diene-based monomer which is further introduced, from the living anionic polymer.

In addition, the step of preparing the triblock copolymer may be a step for preparing the solution including the triblock copolymer to which the diblock copolymer is coupled, that is, the triblock copolymer, by subjecting the second diblock copolymer included in the second diblock copolymer solution prepared in the step of preparing the second diblock copolymer to a coupling reaction using a coupling agent. The second diblock copolymer solution prepared in the step of preparing the second diblock copolymer includes the second diblock copolymer, and since the copolymer is the living anion copolymer in which the end of the copolymer, specifically the end of the block containing the second conjugated diene-based monomer-derived repeating unit is in an anion active state by polymerization in the previous step of preparing the second deblock copolymer, depending on the number of functional groups which may be substituted or added, contained in the coupling agent, the functional group of the second coupling agent is substituted with the living anionic copolymer, or a coupling reaction of adding the living anionic copolymer to the functional group of the second coupling agent may be performed. That is, the triblock copolymer may be a copolymer in which the second diblock copolymer is linked by the coupling agent, depending on the number of functional groups which may be substituted or added, contained in the coupling agent, and as a specific example, two or more second diblock copolymers may be coupled by the coupling agent-derived linking group, and as a more specific example, two to four second diblock copolymers may be coupled by the coupling agent-derived linking group.

In addition, the step of preparing the triblock copolymer may optionally further include after the coupling reaction, adding water or alcohol to the reactor to remove activity of the polymer being in an active state.

According to the present invention, the hydrocarbon-based solvent does not react with the polymerization initiator and any hydrocarbon-based solvent may be used as long as it is commonly used in an anion polymerization reaction. As a specific example, the hydrocarbon-based solvent may be a linear or branched aliphatic hydrocarbon compound such as butane, n-pentane, n-hexane, n-heptane, or iso-octane; a cyclic aliphatic hydrocarbon compound unsubstituted or substituted by an alkyl group such as cyclopentane, cyclohexane, cycloheptane, methyl cyclohexane, or methyl cycloheptane; or an aromatic hydrocarbon compound unsubstituted or substituted by an alkyl group such as benzene, toluene, xylene, or naphthalene, and among them, any one or a mixture of two or more may be used.

In addition, the polymerization initiator used in the step of preparing the block copolymer may be one or more selected from the polymerization initiators described above.

The step of mixing the diblock copolymer and the triblock copolymer may be a step for preparing the block copolymer composition present in the state in which the diblock copolymer and the triblock copolymer are mixed with each other. The mixing may be carried out by mixing the copolymers each in a powder form, and in order to evenly disperse and distribute the diblock copolymer and the triblock copolymer in the block copolymer composition, the mixing may be carried out by mixing a solution including the diblock copolymer prepared in the previous step and a solution including the triblock copolymer prepared in the previous step, and in this case, dispersibility of the diblock copolymer and the triblock copolymer is excellent and a distribution is even, whereby there is an effect that a balance between the physical properties of the asphalt composition including the block copolymer composition is excellent.

<Asphalt Composition>

According to the present invention, an asphalt composition including the block copolymer composition as an asphalt modifier is provided. The asphalt composition may include the block copolymer composition and asphalt. Here, the block copolymer composition may be included at 1 part by weight to 10 parts by weight, 3 parts by weight to 8 parts by weight, or 4 parts by weight to 6 parts by weight, based on total 100 parts by weight of the asphalt composition, and within the range, there are effects that the solubility of the block copolymer composition in asphalt is excellent and the physical properties of the asphalt composition are excellent.

The asphalt composition may further include a crosslinking agent for crosslinking the asphalt composition. The crosslinking agent may be a sulfur compound containing sulfur or iron sulfate, and as a specific example, may be a sulfur element (powder), and the crosslinking agent may be included at 0.05 parts by weight to 3 parts by weight, based on total 100 parts by weight of the asphalt composition, and within the range, there are effects of maintaining an appropriate crosslinking reaction to improve physical properties at high temperature and elasticity and preventing gelation.

In addition, the asphalt may include 1% by weight to 40% by weight or 5% by weight to 30% by weight of asphaltene, based on the total weight of asphalt.

In addition, the asphalt composition may be a building material such as road pavement materials or water-proof materials.

Hereinafter, the present invention will be described in more detail by the Examples. However, the following Examples are provided for illustrating the present invention. It is apparent to a person skilled in the art that various modifications and alterations may be made without departing from the scope and spirit of the present invention, and the scope of the present invention is not limited thereto.

EXAMPLES

Example 1

<Preparation of Diblock Copolymer>

4440 g of cyclohexene and 1.965 g of N,N-dimethylvinylbenzylamine were dissolved in a nitrogen-substituted SUS high-pressure reactor and the temperature was raised to 60° C. When the reactor temperature reached 60° C., 25.44 g of n-butyllithium diluted at 4% in cyclohexane was added. As the solution has an anion group, it turned red. The solution was stirred for 10 minutes to prepare a solution including a modified initiator represented by the following Chemical Formula 2. Subsequently, 612 g of 1,3-butadiene was introduced to the thus-prepared solution including the modified initiator and a butadiene block was polymerized while stirring. When the butadiene monomer was all consumed, 238 g of styrene was then introduced to the mixed solution in which the butadiene block was produced, polymerization was performed until styrene was completely consumed, 10 g of water as a reaction terminator was introduced to remove a reaction activity, and a diblock copolymer solution including a (butadiene)-(styrene) diblock copolymer substituted with a functional group derived from a modified initiator represented by the following Chemical Formula 2 was prepared.

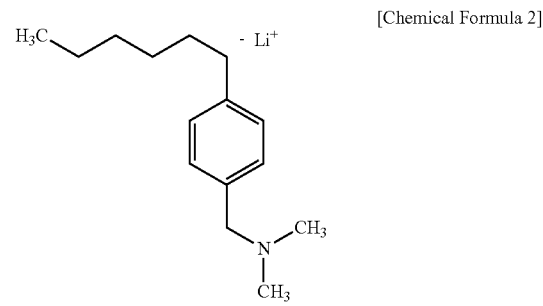 [SMILES: CCCCCCc1ccc(CN(C)C)cc1 ; [Li+]]

[Chemical Formula 2]

<Preparation of Triblock Copolymer>

4440 g of purified cyclohexane and 238 g of styrene were introduced to a nitrogen-substituted reactor of 10 L and the temperature was raised to 60° C. while stirring. When the reactor temperature reached 60° C., 25.44 g of n-butyllithium diluted at 4% in cyclohexane was introduced to the reactor to polymerize a styrene block.

Subsequently, when the styrene was all consumed, 612 g of 1,3-butadiene was introduced to perform polymerization until 1,3-butadiene was all consumed, thereby preparing a (styrene)-(butadiene) diblock copolymer.

After completion of the polymerization reaction, 0.77 g of dimethyldichlorosilane as a coupling agent was introduced to the mixed solution in which the (styrene)-(butadiene) diblock copolymer was produced, under the condition of 105° C. and 3.5 bar, and a coupling reaction was carried out for 5 minutes. Subsequently, 1 g of water as a reaction terminator was introduced to remove a reaction activity, and then a triblock copolymer solution including a triblock copolymer to which the (styrene)-(butadiene) diblock copolymer is coupled was prepared. Here, coupling efficiency was 92.89%.

<Preparation of Block Copolymer Composition>

33 parts by weight (based on a solid content) of the thus-prepared diblock copolymer and 67 parts by weight (based on a solid content) of the thus-prepared triblock copolymer were mixed for 10 hours, and the mixed solution was stripped, agglomerated, and dried to prepare a block copolymer composition pellet.

Example 2

The same process as in Example 1 was performed, except that in the preparation of the diblock copolymer, 1.965 g of vinylbenzylamine (primary amine) was introduced instead of 1.965 g of N,N-dimethylvinylbenzylamine to prepare a solution including the modified initiator represented by the following Chemical Formula 3.

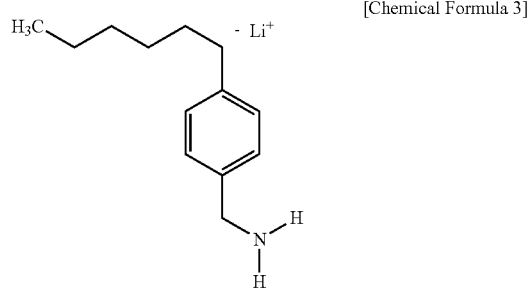

[Chemical Formula 3]

Example 3

The same process as in Example 1 was performed, except that in the preparation of the block copolymer composition, 52 parts by weight instead of 33 parts by weight (based on a solid content) of the diblock copolymer solution and 48 parts by weight instead of 67 parts by weight (based on a solid content) of the triblock copolymer solution were used.

Example 4

The same process as in Example 1 was performed, except that in the preparation of the block copolymer composition, 16 parts by weight instead of 33 parts by weight (based on a solid content) of the diblock copolymer solution and 84 parts by weight instead of 67 parts by weight (based on a solid content) of the triblock copolymer solution were used.

Comparative Example 1

The same process as in Example 1 was performed, except that in the preparation of the block copolymer composition, the triblock copolymer solution was not used and only 100 parts by weight (based on a solid content) of the diblock copolymer solution was used.

Comparative Example 2

The same process as in Example 1 was performed, except that in the preparation of the block copolymer composition, the diblock copolymer solution was not used and only 100 parts by weight (based on a solid content) of the triblock copolymer solution was used.

Comparative Example 3

<Preparation of Triblock Copolymer>

4440 g of purified cyclohexane and 238 g of styrene were introduced to a nitrogen-substituted, 10 L reactor and the temperature was raised to 60° C. while stirring. When the reactor temperature reached 60° C., 28.54 g of n-butyllithium diluted at 4% in cyclohexane was introduced to the reactor to polymerize a styrene block.

Subsequently, when the styrene was all consumed, 612 g of 1,3-butadiene was introduced to perform polymerization until 1,3-butadiene was all consumed, thereby preparing a (styrene)-(butadiene) diblock copolymer.

After completion of the polymerization reaction, 1.003 g of dimethyldichlorosilane as a coupling agent was introduced to the mixed solution in which the (styrene)-(butadiene) diblock copolymer was produced, under the condition of 105° C. and 3.5 bar, and a coupling reaction was carried out for 5 minutes. Subsequently, 1 g of water as a reaction terminator was introduced to remove a reaction activity, and then a triblock copolymer solution including a triblock copolymer to which the (styrene)-(butadiene) diblock copolymer is coupled was prepared. Here, coupling efficiency is shown in the following Table 1.

Comparative Example 4

The same process as in Comparative Example 3 was performed, except that in the preparation of the triblock copolymer, 26.5 g instead of 28.54 g of n-butyllithium diluted at 4% in cyclohexane and 0.75 g instead of 1.003 g of dimethyldichlorosilane were used.

Comparative Example 5

The same process as in Comparative Example 3 was performed, except that in the preparation of the triblock copolymer, 0.90 g instead of 1.003 g of dimethyldichlorosilane was used.

Comparative Example 6

The same process as in Comparative Example 3 was performed, except that in the preparation of the triblock copolymer, 23.67 g instead of 28.54 g of n-butyllithium diluted at 4% in cyclohexane and 0.85 g instead of 1.003 g of dimethyldichlorosilane were used.

EXPERIMENTAL EXAMPLES

Experimental Example 1

TSV viscosity (cSt), a maximum peak molecular weight (Mp, $\times 10^3$ g/mol), and coupling efficiency (C/E, %) of each of the block copolymer compositions prepared in Examples 1 to 4 and Comparative Examples 1 to 6, and the content of the styrene monomer-derived repeating unit and the content of the vinyl monomer-derived repeating unit in the block copolymer compositions are shown in the following Table 1.

In addition, for comparison of the softening point, the viscosity, and the phase separation temperature when each of the block copolymer compositions prepared in Examples 1 to 4 and Comparative Examples 1 to 6 was used as the asphalt modifier, 4.5% by weight of each of the block copolymer compositions prepared in Examples 1 to 4 and Comparative Examples 1 to 6 was calculated and added to 600 g of asphalt (SK AP-5) under the condition of 180° C., mixed at 2,500 rpm for 30 minutes in a high shear mixer (HSM), and then stirred at 250 rpm for 2 hours in a low shear mixer (LSM), and the softening point, the viscosity, and the phase separation temperature (solubility) were measured, and are shown in Table 1.

TSV viscosity (cSt): measured by dissolving the block copolymer composition in toluene at a concentration of 5% by weight and using a capillary viscometer in a thermostat maintained at 25° C.

Maximum peak molecular weight (Mp, ×10³ g/mol), coupling efficiency (%), and content of styrene monomer-derived repeating unit and content of vinyl monomer-derived repeating unit: Two PLgel Olexis columns (manufactured by Polymer Laboratories Ltd.) and one PLgel mixed-C column (manufactured by Polymer Laboratories Ltd.) were combined to measure gel permeation chromatography (GPC), as a GPC standard material in the calculation of the maximum peak molecular weight, polystyrene (PS) was used, and the content of the styrene monomer-derived repeating unit and the content of the vinyl monomer-derived repeating unit were measured by GPC and 1H NMR. The coupling efficiency was calculated by the following Equation 1 using a peak area of a polymer represented in GPC and represented.

Coupling efficiency (%)={(area of coupled polymer)/(area of entire polymer)}×100    [Equation 1]

Softening point (° C.): in accordance with ASTM D36, when heating water or glycerin by 5° C. per 1 minute, an asphalt composition specimen started to be softened by the heating, and the temperature when a bead having a diameter of 9.525 mm and a weight of 3.5 g, disposed on the specimen fell by 1 inch was measured.

Viscosity (cps): in the preparation of the asphalt composition, after 2 hours of low shear stirring, viscosity at 135° C. was measured using a BROOK FIELD VISCOMETER.

Phase separation temperature (solubility ΔT, ° C.): 50 g of the prepared asphalt composition was weighed in an aluminum tube, aged in an oven at 180° C. for 72 hours, and divided into three equal parts, and the softening points of the upper and lower parts were measured as described above. Here, the lower the phase separation temperature is, the higher the solubility is.

TABLE 1

| Classification | Example | | | | Comparative Example | | | | | |
|---|---|---|---|---|---|---|---|---|---|---|
| | 1 | 2 | 3 | 4 | 1 | 2 | 3 | 4 | 5 | 6 |
| TSV viscosity (cSt) | 14.04 | 14.06 | 12.80 | 17.50 | 7.382 | 18.19 | 14.05 | 14.12 | 12.81 | 17.55 |
| SBS Mp (×10³ g/mol) | 126.3 | 126.5 | 125.270 | 122.030 | — | 121.902 | 109.750 | 113.205 | 107.031 | 120.450 |
| SB Mp (×10³ g/mol) | 65.536 | 66.12 | 67.22 | 69.432 | 65.318 | 69.609 | 58.731 | 61.507 | 58.282 | 67.340 |
| C/E (%) | 67.44 | 66.44 | 50.20 | 83.25 | — | 92.89 | 86.96 | 68.23 | 82.82 | 82.84 |
| Styrene (% by weight) | 28.4 | 28.5 | 28.5 | 28.4 | 28.4 | 28.65 | 28.9 | 28.7 | 29.1 | 28.5 |
| Vinyl (% by weight) | 17.0 | 17.1 | 17.4 | 17.2 | 17.0 | 17.6 | 19.0 | 17.5 | 16.04 | 17.1 |
| Softening point (° C.) | 87.1 | 87.0 | 89.5 | 88.1 | 68.0 | 92.5 | 85.8 | 86.1 | 85.4 | 88.0 |
| Viscosity (cps) | 2,385 | 2,410 | 2,250 | 2,420 | 1,545 | 2,590 | 2,260 | 2,275 | 2,112 | 2,415 |
| Phase separation temperature (ΔT) | 0.9 | 1.6 | 4.2 | 3.9 | 0.1 | 27 | 0.2 | 11 | 4.2 | 13 |

As shown in Table 1, it was confirmed that in the Examples using the block copolymer compositions including the diblock copolymer and the triblock copolymer according to the present invention as the asphalt modifying agent, both the softening point and the solubility were excellent.

However, it was confirmed that in Comparative Example 1 including only the diblock copolymer the lowered softening point was lowered, and in Comparative Example 2 including only the triblock copolymer, the solubility was lowered.

In addition, as the case of using the diblock copolymer having no functional group derived from the modified initiator represented by Chemical Formula 1, in Comparative Examples 3 to 6 which are not the block copolymer composition prepared in the manner of mixing the diblock copolymer and the triblock copolymer, it was recognized that the softening point was lowered as compared with the Examples according to the present invention (Comparative Examples 3 and 5), or the solubility confirmed by the phase separation temperature was lowered (Comparative Examples 4 and 6).

The invention claimed is:

1. A block copolymer composition comprising a diblock copolymer and a triblock copolymer,
wherein the diblock copolymer includes a first block containing a first conjugated diene-based monomer-derived repeating unit and a second block containing a first vinyl aromatic monomer-derived repeating unit, and a functional group derived from a modified initiator represented by the following Chemical Formula 1 is included at an end of the diblock copolymer:

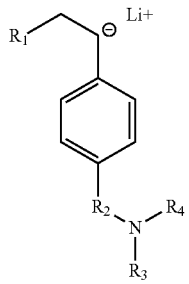

[Chemical Formula 1]

wherein $R_1$ is a hydrocarbyl group having 1 to 20 carbon atoms; $R_2$ is an alkylene group having 1 to 30 carbon atoms; and $R_3$ and $R_4$ are independently of each other hydrogen or an alkyl group having 1 to 30 carbon atoms.

2. The block copolymer composition of claim 1, wherein the block copolymer composition includes 25% by weight to 42% by weight of the diblock copolymer and 58% by weight to 75% by weight of the triblock copolymer.

3. The block copolymer composition of claim 1, wherein the block copolymer composition includes 30% by weight to 35% by weight of the diblock copolymer and 65% by weight to 70% by weight of the triblock copolymer.

4. The block copolymer composition of claim 1, wherein $R_1$ is a hydrocarbyl group having 2 to 8 carbon atoms; $R_2$ is an alkylene group having 1 to 8 carbon atoms; and $R_3$ and $R_4$ are independently of each other hydrogen or an alkyl group having 1 to 8 carbon atoms.

5. The block copolymer composition of claim 1, wherein the modified initiator represented by Chemical Formula 1 is a modified initiator represented by the following Chemical Formula 2 or Chemical Formula 3.

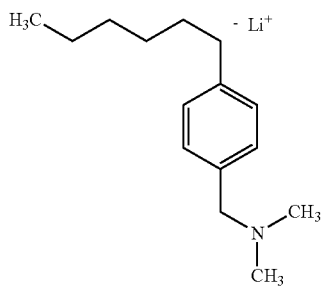

[Chemical Formula 2]

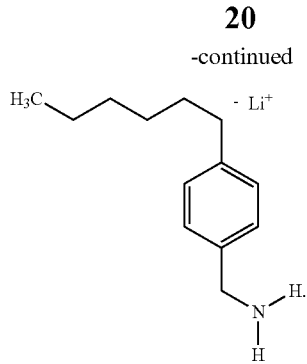

[Chemical Formula 3]

6. The block copolymer composition of claim 1, wherein the triblock copolymer includes a third block containing a second vinyl aromatic monomer-derived repeating unit, a fourth block containing a second conjugated diene-based monomer-derived repeating unit, and a coupling agent-derived linking group.

7. The block copolymer composition of claim 1, wherein coupling efficiency of the block copolymer composition is 62% to 79%.

8. The block copolymer composition of claim 1, wherein coupling efficiency of the block copolymer composition is 65% to 67%.

9. A method of preparing a block copolymer composition, comprising:
preparing a first block containing a first conjugated diene-based monomer-derived repeating unit in the presence of a modified initiator represented by the following Chemical Formula 1;
polymerizing a second block containing a first vinyl aromatic monomer-derived repeating unit in the presence of the first block prepared previously, to prepare a diblock copolymer;
preparing a triblock copolymer; and
mixing the diblock copolymer and the triblock copolymer:

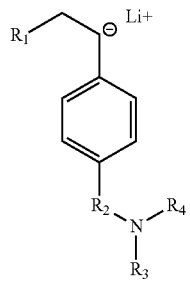

[Chemical Formula 1]

wherein $R_1$ is a hydrocarbyl group having 1 to 20 carbon atoms; $R_2$ is an alkylene group having 1 to 30 carbon atoms; and $R_3$ and $R_4$ are independently of each other hydrogen or an alkyl group having 1 to 30 carbon atoms.

10. The method of preparing a block copolymer composition of claim 9, wherein the block copolymer composition includes 25% by weight to 42% by weight of the diblock copolymer and 58% by weight to 75% by weight of the triblock copolymer.

11. An asphalt composition comprising the block copolymer composition of claim 1 and asphalt.

12. The asphalt composition of claim 11, wherein the asphalt composition includes 1 part by weight to 10 parts by weight of the block copolymer composition, based on a total 100 parts by weight of the asphalt composition.

\* \* \* \* \*